April 21, 1925.
W. L. THIEDEMANN ET AL
DENTAL TOOL
Filed May 7, 1923   2 Sheets-Sheet 1
1,534,817
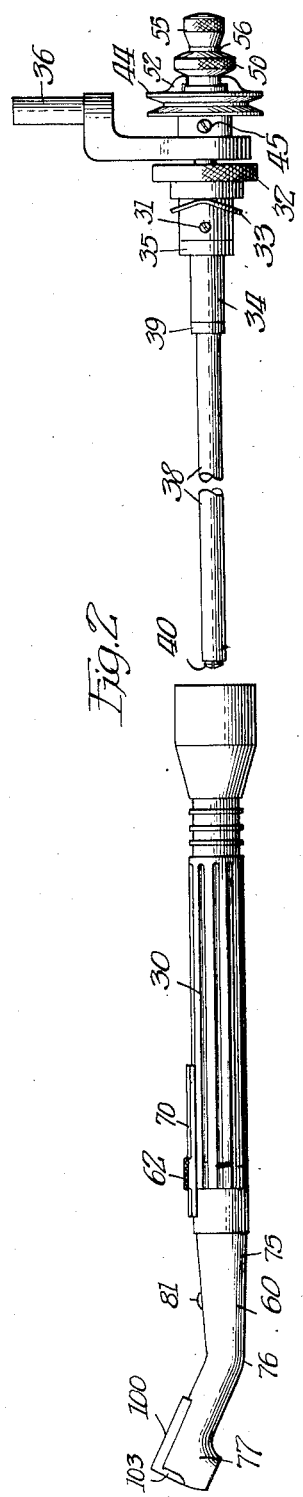
Inventors:
William L. Thiedemann,
Hazlett M. Hardy,
By Fisher, Towle, Clapp & Soans
Attys.

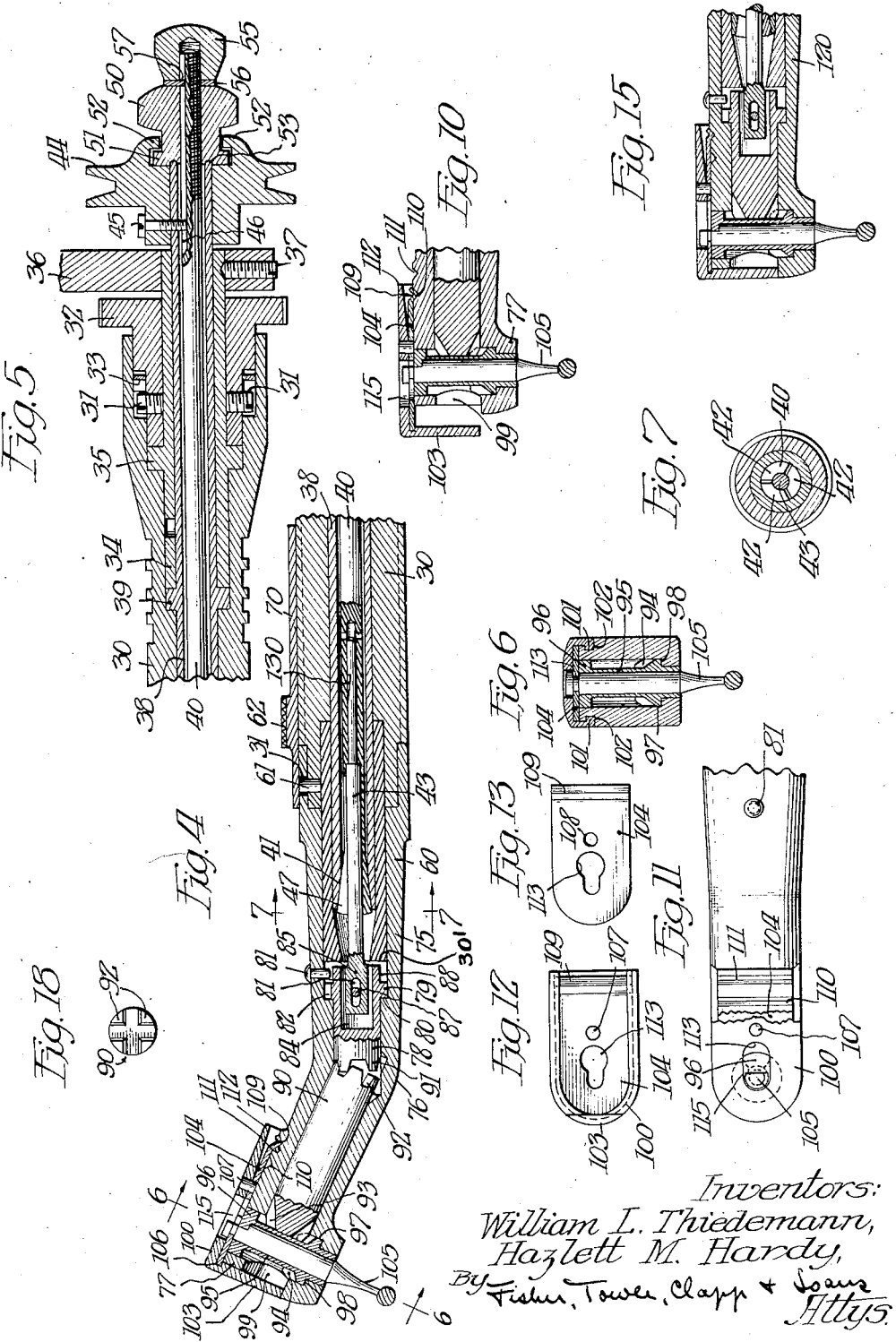

Patented Apr. 21, 1925.

1,534,817

UNITED STATES PATENT OFFICE.

WILLIAM L. THIEDEMANN AND HAZLETT M. HARDY, OF MUSKEGON, MICHIGAN, ASSIGNORS TO THIEDEMANN-HARDY COMPANY, OF MUSKEGON, MICHIGAN, A COPARTNERSHIP COMPRISING WILLIAM L. THIEDEMANN AND HAZLETT M. HARDY.

DENTAL TOOL.

Application filed May 7, 1923. Serial No. 637,399.

*To all whom it may concern:*

Be it known that we, WILLIAM L. THIEDEMANN and HAZLETT M. HARDY, citizens of the United States, residing at Muskegon, in the county of Muskegon and State of Michigan, have invented certain new and useful Improvements in Dental Tools, of which the following is a specification.

This invention relates to dental apparatus but more particularly to handpieces for use with dental engines and has for its primary object to provide a device which is simple in construction, efficient in operation and easily cleaned.

These handpieces are used to hold and operate a rotary tool which is inserted in the mouth of the patient, and it is particularly important that the construction may be quickly and easily disassembled for the purpose of sterilization and cleaning. It is impracticable to attempt to sterilize the assembled handpiece as this tends to solidify or destroy the lubrication and produce dust without removing the grit. The assembled handpiece cannot be adequately lubricated without using an excess of oil which subsequently will be released in the patient's mouth. In order to eliminate these objectionable features a construction has been devised which will permit the entire handpiece to be quickly disassembled or assembled without the use of any tools. The individual parts may be thoroughly cleaned, sterilized and given a thin coating of lubricant prior to assembling. The cleaning operation is exceedingly simple as there are no inaccessible places where foreign matter may collect and be removed with difficulty. In fact the entire construction may be said to consist of a series of tubes or sheaths and the only necessary cleaning tool is a small rod.

Further objects of the invention are to impart to the tool a smooth and powerful action, to eliminate small and easily broken parts, to compensate for adjustment of the collet, to provide an improved cap construction for the tool holder, to provide an advantageous tool locking device for the holder, to provide an improved driving connection in the contra-angle tool holder, to provide an improved clutch or chuck for engaging the shaft, to insure centering of the collet within the spindle.

The many other objects and advantages of our invention will be better understood by reference to the following specification when considered in connection with the accompanying drawings illustrating a selected embodiment thereof, in which:—

Fig. 1 is a side elevation of a dental handpiece complete in which are embodied the principles of my invention.

Fig. 2 is the same as Fig. 1, with the driving spindle withdrawn from the outer sheath.

Fig. 3 is a plan view of one end portion of the handpiece illustrating the method of attaching the tool holder.

Fig. 4 is an enlarged central longitudinal section of the outer end portion of the handpiece.

Fig. 5 is an enlarged central longitudinal section of the inner end portion of the handpiece.

Fig. 6 is a transverse section on the line 6—6 of Fig. 4.

Fig. 7 is a transverse section on the line 7—7 of Fig. 4.

Fig. 8 is an enlarged transverse section on the line 8—8 of Fig. 3.

Fig. 9 is a detail bottom plan view of the locking piece.

Fig. 10 is an enlarged detail sectional view.

Figs. 11 to 13 are enlarged detail views.

Fig. 14 is a detail view of a right angle tool holder.

Fig. 15 is an enlarged detail longitudinal sectional view of the outer end portion of the tool holder shown in Fig. 14.

Fig. 16 is a detail view of a straight tool holder.

Fig. 17 is an enlarged detail longitudinal sectional view of the holder shown in Fig. 16, and Fig. 18 is a detail view.

Referring to the drawings and particularly to Figs. 1 to 13 inclusive, the dental handpiece comprises an outer sheath 30 which is provided with bayonet joints, as 31, on opposite sides, to permit it to be locked to the sheath base 32. A spring washer 33 is preferably provided to prevent accidental release of the sheath 30. A sleeve 34 fits within this base and is provided with a collar 35 abutting the end of the base. The usual bracket 36 for the wrist joint (not shown) is secured upon this sleeve by the set screw 37. A tool driving spindle 38 fits within the sleeve 34 and is provided with a retaining collar 39 which fits between the end of the sleeve and a shoulder on the sheath. A collet 40 loosely fits within this spindle. The outer end 47 of the collet is conical in form to co-act with the conical socket 41 formed in the outer end of the spindle. This outer end 47 of the collet is split longitudinally and the split portion expanded to provide a plurality of spring jaws 42 to grip the tool driving stem or shaft 43 when the conical portion of the collet is drawn within the spindle in the manner to be presently described.

A driving pulley 44 is secured upon the spindle 38 by a small screw 45 which projects through the spindle and enters a keyway 46 in the collet 40 to cause this pulley to drive the spindle and collet. The pulley 44 is driven by the usual belt from a similar pulley (not shown) on the wrist joint as is customary in this type of handpiece. An adjusting nut 50 fits upon the threaded inner end of the collet. This nut has a collar 51 formed on its forward end which rests between a pair of jaws 52 on the pulley 44 so that rotation of the nut will positively move the collet in or out, according to the direction of rotation. An annular groove 53 is preferably formed in the forward face of the nut 50 to receive and fit the slightly projecting rear end of the spindle 38. This groove causes the sleeve to accurately position the collet and maintain it coaxial therewith. A limiting nut 55 is preferably placed upon the outer end of the collet and a small washer 56 is placed between the nuts 50 and 55. A tit 57 on this washer fits within the key-way 46 to prevent revolution of the washer on the collet. This washer prevents any rotation of the limiting nut on the collet by the frictional engagement of the adjusting nut therewith. The function of the nut 55 is to prevent the collet being advanced too far by the adjusting nut.

A tool holder 60 is adapted to be slid upon the forward end of the sheath 30 and to be held thereon by a bayonet joint 61. In order to prevent possible release of the tool holder, we have provided a slidable locking piece 62 which is mounted in a groove 63 in the forward end of the sheath. When the holder is slid longitudinally upon the sheath and then turned in the manner common to bayonet joints, it brings the longitudinal portion of the slot in the holder into registration with the slot in which the locking piece is mounted. When the locking piece is now advanced by the thumb of the operator, the forward portion of this part enters the longitudinal portion of the slot in the holder and advances to the forward end thereof. This prevents the pin of the joint from leaving the transverse portion of the slot in the holder and thus locks the holder upon the sheath until such time as the locking piece is withdrawn. The locking piece may be formed in a variety of ways but we have found a convenient form to be that shown in the drawings and particularly Figs. 3, 8 and 9. This locking piece comprises a plate 70 fitting upon the outer wall of the sheath and having attached to its under face a retaining and guiding member 71 which slides in the groove 63. The rear end portion of this member is split and expanded, as at 72, so that it presses against the side walls of the groove and provides frictional resistance to the movement of the locking piece in this groove.

Various types of holders are provided for the convenience of the operator. The holder 60 is of the contra-angle type. In Figs. 14 and 15, we have illustrated what is familiarly known as the right angle type. These holders will now be described in detail. The holder 60 comprises an outer shell 75 bent at 76 and provided at its outer end with a tool holding head 77. A substantially cylindrical gear block 78 fits within the rear portion of the holder and is provided with a collar 79 which abuts an annular shoulder 80 therein. A retaining pin 81 projects through the wall of the shell and enters the bore (Fig. 4). A slot 82 is provided in the collar 79 so that when this slot is brought into registration with the pin 81, the block may be inserted into the rear end of the holder to the position indicated. A socket 84 is formed in the rear end of this block to receive the compensating head 85 on the stem 43 of the gear block. This stem is connected to the block by a pin 87 passing through the block and a longitudinal slot 88 in the head 85 on the stem. The inner portion of this stem is adapted to enter the forward end of the collet when the holder is placed upon the sheath and to be gripped by the jaws 42 of the collet when the collet is drawn rearwardly by the adjusting screw. This slotted connection of the gear block and stem is particularly important as it permits the stem to move longitudinally with the collet during the locking and releasing movement without producing any longitudinal movement of the block proper. If it were not for this compensating joint, the block would be moved and a proper meshing of this block with the next gear block 90 would not be obtained. The gear blocks 78 and 90 have gears 91 and 92 respectively formed on their opposing ends and these mesh in the manner indicated in Fig. 4. A gear 93 is formed on the opposite end of the block 90 to mesh with a bevel gear 94 on the tool holding sleeve 95 in the head 77. The outer end 30' of the sheath forms a thrust bearing for the rear end of the block 78.

The sleeve 95 is provided with supporting collars 96 and 97 which fit within the bore of the head, the collar 97 abutting an annular shoulder 98. The head is provided with an opening 99 opposite and corresponding to the bore of the holder. The gear block 90 is inserted through this opening before the tool holding sleeve is placed in the head. A cap 100 is provided upon the head 77 and this cap is provided with guide flanges 101 which fit in corresponding grooves 102 in the side walls of the head to permit the head to slide longitudinally of the end portion of the holder. A flange 103 projects downwardly from the outer edge of the cap and forms a closure for the opening 99. A spring plate 104 is interposed between the cap and the head to perform the two-fold function of locking the operating tool or bur 105 within the sleeve 95 and providing a yielding lock for the cap. The forward end of the spring plate enters a corresponding groove 106 in the cap while the main portion of the plate is secured to the cap by means of a pin 107 passing through a perforation 108 in the plate. The inner end portion of the plate is provided with a transverse rib 109 formed by indenting this plate. This rib is adapted to enter corresponding notches 110 and 111 to respectively hold the cap in open or closed position. The cap is shown in open position in Fig. 10 and in open position in Fig. 4. The cap is moved from closed to open position by merely pressing against the rear edge 112 with the finger and is entirely removed by continuing this pressure until the flanges 101 leave the outer ends of the grooves 102.

The plate 104 is provided with a slot 113 to admit the inner end of the tool or bur 105. This slot will be seen to be enlarged at one end. The end of the tool is inserted through this enlarged portion when the cap is in open position and is locked in the sleeve 103 when the cap is moved to closed position, the constricted walls of the slot entering the usual groove in the tool. The tool is caused to rotate with the sleeve by the formation of the upper portion of the tool socket, as is customary in this type of holder. The cap 100 is provided with a perforation 115 to admit the head of the tool.

The right angle holder 120 shown in Figs. 14 and 15 is the same in construction as the contra-angle already described except that the gear block 121 corresponding to the block 78 of the latter drives the tool holding sleeve 122 directly instead of through an intermediate gear block.

In the straight handpiece shown in Figs. 16 and 17, there are no compensating heads or gear blocks and the tool or bur is inserted directly into the collet in the same manner as was the stem or shaft 43 in the contra-angle. The shell or holder 123 is connected to the sheath in the same manner. To prevent moisture entering the sheath and collet, we find it advisable to place a washer 124 in the front end of the holder, as indicated. This washer may be of rubber or other suitable material.

In practice the same sheath is used with all forms of tool holders. The holders are changed by merely withdrawing the locking piece 62 and disengaging the bayonet joint in the usual manner. The new holder is then placed upon the sheath and secured thereon by the locking piece. The holder is generally the only part actually entering the patient's mouth and this must always be cleaned and sterilized before it can be used on another patient. The holder is disassembled in the following manner:—Remove the cap 100, withdraw compensating gear block by rotating stem to locator notch as 130, in alignment with pin 81 and pull block backward from bore, turn angle piece into vertical position with outer end at highest point permitting intermediate gear block 78 to drop down and out of mesh with the gear or tool holder in the transverse socket, hold horizontally with rear end of transverse socket downward, tap or loosen tool holder and remove, and turn angle piece to vertical position with transverse socket at bottom and permit intermediate gear block to drop out. The disassembled parts may now be thoroughly cleaned, sterilized, oiled and reassembled. To assemble, insert gear block and stem into bore and place it in its most inwardly position by using notch locator in alignment with pin and pushing grooved collar past pin, drop intermediate gear block into opening of bore at outer end of holder forming continuation of main bore, rotate stem of compensating gear block until operation and meshing of angle gears is indicated by intermediate block revolving which can be seen through transverse socket, pull stem of compensating gear block slightly backward to permit intermediate block to retire within the bore entirely back of the transverse socket, introduce tool holder into position in transverse head, push forward compensator gear block by use of stem, turn stem and tool will be assembled; place cap 100 in position on holder, locking tool holder in its position.

To still further clean the handpiece, release the sheath 30 from the base 32 by disengaging the bayonet joints 31 and withdraw the sheath in the manner indicated in Fig. 2. This enables the sheath to be cleaned and sterilized. If more complete disassembly is desired, remove the limiting nut 55 and washer 56, unscrew the nut 50 from the collet, and withdraw the collet 40 from the forward end of the sleeve 34. All parts may now be readily cleaned, sterilized, oiled and reassembled.

It will be noted that all parts are removed by a sliding motion, that there are no threaded connections, that no tools are necessary, that the parts are loosely connected or floating, that provision is made for the take-up of the driving stem or shaft when the collet is being closed, that the sleeve which carries the sheath base and bracket is free upon the spindle and merely forms a rear bearing therefor, that the collet is stabilized in the spindle and prevented from relative rotation when the collet adjusting nut is tightened or loosened, that a universal joint action is obtained in the contra-angle holder, that the shells of the holders in all forms are made in one piece, and that the opening at the outer end of the tool holder is a continuation of the bore and thus facilitates the cleaning of the bore.

We are aware that numerous changes may be made in the construction and arrangement of parts without departing from the scope of our invention, and we reserve the right to make all such as fairly fall within the scope of the following claims.

We claim as our invention:

1. In a dental operating piece, the combination with a sheath, of a toll holder slidable over the outer end of said sheath and adapted to be connected thereto by a bayonet joint formed on said holder and said sheath.

2. In a dental operating piece, the combination with a sheath, of a tool holder slidable over the outer end of said sheath, and slidable means for locking said holder upon said sheath.

3. In a dental operating piece, the combination with a sheath, of a tool holder slidable over the outer end of said sheath and adapted to be connected thereto by a bayonet joint formed on said holder and said sheath, and means co-acting with said joint for locking said holder upon said sheath.

4. In a dental operating piece, the combination with a sheath, of a tool holder slidable over the end of said sheath and adapted to be connected thereto by a bayonet joint formed on said holder and said sheath, and means including a slidable member for locking said holder and said sheath in connected position.

5. In a dental operating piece, a tool holder having a transverse socket formed in its outer end, a tool operating sleeve insertable into the rear end of said socket, a cap on said holder to retain said sleeve in said socket, and a latch plate interposed between said cap and said holder.

6. In a dental operating piece, a tool holder having a transverse socket formed in the outer end thereof, a tool operating sleeve insertable into the rear end of said socket, a cap slidable on said holder to retain said sleeve in said socket, and a latch plate of spring metal interposed between said cap and said holder.

7. In a dental operating piece, a tool holder having a transverse socket formed in the outer end thereof, a tool operating sleeve in said socket, means for operating said sleeve, a cap on said holder over the outer end of said socket, and a tool locking plate interposed between said cap and said holder and detachably carried by said cap.

8. In a dental operating piece, a tool holder having a transverse socket formed in the outer end thereof, a tool operating sleeve in said socket, driving means for said sleeve, and a cap on the end portion of said holder having its opposite side edges turned inwardly to slidably fit within corresponding retaining grooves in said holder, said cap forming the means for retaining said sleeve within said socket.

9. An angle piece comprising a substantially tubular casing, a transverse socket near its outer end, a tool operating member within said socket, and driving means for said member including revoluble gear blocks arranged end to end within said casing and slidable longitudinally of the bore into position therein.

10. An angle piece comprising a substantially tubular casing, a transverse socket near its outer end, a tool operating sleeve within said socket, and driving means for said sleeve including substantially cylindrical gear blocks arranged end to end within said casing and free to move therein longitudinally of the bore to permit self-adjustment.

11. A contra-angle piece comprising a tubular casing open at its ends and provided with a bend intermediate said ends, a transverse socket near its outer end, a tool operating sleeve within said socket, and driving means for said sleeve including a pair of substantially cylindrical gear blocks arranged substantially end to end within said casing, one of said blocks being disposed on each side of said bend and being slidable into operative relation with the other block through the corresponding end of the casing.

12. In a dental hand-piece, a tool holder having a transverse socket formed in the outer end thereof, a tool operating sleeve in said socket, and driving means for said sleeve including a gear block, and an operating block connected to said stem by a compensating joint.

13. In a dental handpiece, a tool holder having a transverse socket formed in the outer end thereof, a tool operating sleeve in said socket, and driving means for said sleeve including a substantially cylindrical block having a gear formed on one end and a socket in the opposite end thereof, a compensating head connected to said block within said socket, and an operating stem on said head.

14. In a dental handpiece, a tool holder having a transverse socket formed in the outer end thereof, a tool operating sleeve in said socket, and driving means for said sleeve including a substantially cylindrical block having a gear formed on one end and a socket in the opposite end thereof, a compensating head loosely fitting within said socket and connected to said block by a pin passing through a longitudinal slot in said head, and an operating stem on said head.

15. In a dental operating piece, a tool holder comprising a substantially tubular casing having a transverse socket near its outer end, a tool operating member revoluble within said socket, and driving means for said member including a gear block in the bore of said casing and free to move therein longitudinally of said bore to permit self adjustment.

16. In a dental operating piece, a tool holder comprising a substantially tubular casing having a transverse socket near its outer end, a tool operating sleeve revoluble in said socket, and driving means for said member including a pair of gear blocks arranged end to end in the bore of said casing and free to move therein longitudinally of said bore to permit self adjustment.

17. In a dental operating piece, a tool holder comprising a substantially tubular casing having a transverse socket near its outer end, a tool operating member located in said socket, and driving means for said member including a revoluble gear block insertable into the inner end of the bore in said casing, a slotted collar on said block cooperating with a shoulder on said holder to determine the advance of said block within said bore, and a retaining pin in said bore to prevent the withdrawal of said block except when the slot in said collar is opposite said pin.

18. In a dental operating piece, a tool holder comprising a substantially tubular casing having a transverse socket near its outer end, a revoluble tool holding member mounted in said socket, and driving means for said member including a revoluble gear block insertable into the inner end of the bore of said casing, an operating stem connected to said block, a transversely slotted collar on said block cooperating with a shoulder on said holder to determine the advance of said block within said bore, a retaining pin in said bore to prevent the withdrawal of said block except when the slot in said collar is opposite said pin, and an indicating mark on said stem in the same position as the slot in said collar.

19. In a dental handpiece, a sheath, a tubular spindle within said sheath, and a collet within said spindle actuated by the relative movement of said spindle and said collet.

20. In a dental handpiece, a sheath, a tubular driving spindle within said sheath, a collet within said spindle actuated by the longitudinal movement of said collet in said spindle, and means for preventing relative rotation of said collet and said spindle.

21. In a dental handpiece, a sheath, a tubular driving spindle within said sheath, a collet slidable within said spindle and means co-acting with the outer end of said spindle for moving said collet longitudinally within said spindle to cause the operating portion of said collet to be expanded and contracted by the conformation of the bore of said spindle.

22. In a dental handpiece, a sheath, a tubular driving spindle within said sheath, a collet within said spindle, and an adjusting nut revoluble upon said collet to move said collet longitudinally within said spindle and thereby cause said collet to be expanded and contracted by the conformation of the bore of said spindle.

23. In a dental handpiece, a sheath, a tubular driving spindle within said sheath, a collet within said spindle, an adjusting nut upon said collet, and means for limiting the advance of said collet within said spindle.

24. In a dental handpiece, a sheath, a tubular driving spindle within said sheath, a collet longitudinally slidable within said spindle, an adjusting nut on said collet, and a nut upon said collet to limit the advance of said collet within said spindle.

25. In a dental handpiece, a sheath, a tubular driving spindle within said sheath, a collet longitudinally slidable within said spindle, an adjusting nut on said collet, a limiting nut on said collet, and a washer keyed upon said collet between said nuts.

26. In a dental handpiece, a sheath, a driving spindle within said sheath, a driving pulley secured upon said spindle, a bearing sleeve free upon said spindle and retained thereon by said pulley and a sheath base fixed upon said sleeve.

27. In a dental handpiece, a sheath, a driving spindle within said sheath, a sleeve free upon said spindle, and means including a driving pulley on said spindle for limiting the relative longitudinal movement of said sleeve and said spindle.

28. In a dental handpiece, a driving spindle, a sleeve free upon said spindle, means for preventing endwise movement of said spindle within said sleeve, a sheath base secured upon said sleeve, a sheath enveloping said sleeve and said spindle, and means for attaching said sheath to said base.

29. In a dental handpiece, a hollow driving spindle, a sleeve free upon said spindle, a sheath base secured upon said sleeve, a sheath enveloping said spindle and said sleeve, means for attaching said sheath to said base, and a collet slidable within said spindle.

30. In a dental handpiece, a hollow spindle, a sleeve free upon said spindle, a sheath base and a bracket secured upon said sleeve, a sheath enveloping said spindle and sleeve, means for attaching said sheath to said base, a collet within said spindle, and means for sliding said collet longitudinally within said spindle to cause said collet to open and close.

31. In a dental handpiece, a hollow spindle, a sleeve free upon said spindle, a sheath base secured upon said sleeve, a sheath enveloping said spindle and sleeve, means for attaching said sheath to said base, a collet within said spindle, an adjusting nut to move said collet longitudinally within said spindle, and a nut on said collet to limit the advance of said collet within said spindle.

32. In a dental handpiece, a hollow spindle, a sleeve free upon said spindle, a sheath base secured upon said sleeve, a sheath enveloping said spindle and said sleeve, means for attaching said sheath to said base, a collet within said spindle, means for preventing relative rotation of said collet and said spindle while permitting a limited endwise movement of said collet within said spindle, and means for adjusting the position of said collet within said spindle to cause said collet to be opened and closed.

33. In a dental handpiece, a driving spindle, a sleeve free upon said spindle, a sheath base secured upon said sleeve, a sheath enveloping said sleeve, and means for attaching said sheath to said base comprising a pin projecting from the periphery of said base, and a groove formed in said sheath within the bore to cooperate with said pin to form a bayonet joint.

34. In a dental handpiece, a driving spindle, a sleeve free upon said spindle, a sheath base secured upon said sleeve, a sheath enveloping said sleeve, and means for attaching said sheath to said base comprising pins projecting from the periphery of said base on opposite sides, and grooves formed in said sheath within the bore to cooperate with their respective pins on the base to form bayonet joints.

35. In a dental handpiece, a driving spindle, a sleeve free upon said spindle, a sheath base secured upon said sleeve, a sheath enveloping said sleeve, and means for attaching said sheath to said base comprising pins projecting from the periphery of said base on opposite sides, and grooves formed in said sheath within the bore to cooperate with their respective pins on the base to form bayonet joints, and means interposed between said base and said sheath to yieldingly retain said pins within said grooves.

WILLIAM L. THIEDEMANN.
HAZLETT M. HARDY.